United States Patent
Xu et al.

(10) Patent No.: US 8,724,630 B2
(45) Date of Patent: May 13, 2014

(54) METHOD AND SYSTEM FOR IMPLEMENTING NETWORK INTERCOMMUNICATION

(75) Inventors: Zhijun Xu, Shenzhen (CN); Jun Wang, Shenzhen (CN); Tao Fu, Shenzhen (CN); Qiang Wu, Shenzhen (CN); Bing Huang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 102 days.

(21) Appl. No.: 13/395,718

(22) PCT Filed: Aug. 20, 2010

(86) PCT No.: PCT/CN2010/076206
§ 371 (c)(1),
(2), (4) Date: Mar. 13, 2012

(87) PCT Pub. No.: WO2011/032449
PCT Pub. Date: Mar. 24, 2011

(65) Prior Publication Data
US 2012/0177049 A1    Jul. 12, 2012

(30) Foreign Application Priority Data

Sep. 17, 2009    (CN) .......................... 2009 1 0171974

(51) Int. Cl.
*H04L 12/28* (2006.01)
(52) U.S. Cl.
USPC ........................................................ 370/392
(58) Field of Classification Search
None
See application file for complete search history.

(56) References Cited

U.S. PATENT DOCUMENTS

| | | |
|---|---|---|
| 7,333,510 B1 | 2/2008 | Hies et al. |
| 7,827,313 B2 | 11/2010 | Salmela et al. |
| 7,995,571 B2 | 8/2011 | Park |
| 2008/0271132 A1 | 10/2008 | Jokela et al. |

FOREIGN PATENT DOCUMENTS

| | | |
|---|---|---|
| CN | 1801764 A | 7/2006 |
| CN | 1938999 A | 3/2007 |
| CN | 101120572 A | 2/2008 |
| CN | 101483675 A | 7/2009 |
| JP | 2007522744 | 8/2007 |
| JP | 2008054145 A | 3/2008 |
| KR | 20050041820 A | 5/2005 |

OTHER PUBLICATIONS

Farinacci, D., Fuller, V. and Oran, D., "Locator/ID Separation Protocol (LISP)", IETF Internet-draft, Jan. 2007. http://tools.ietf.org/id/draft-farinacci-lisp-00.txt.*

Lewis, D., Meyer, D., and D. Farinacci, "Interworking LISP with IPv4 and IPv6", draft-lewis-lisp-interworking-00.txt, Dec. 2007. http://tools.ietf.org/id/draft-lewis-lisp-interworking-00.txt.*

(Continued)

*Primary Examiner* — Chi Pham
*Assistant Examiner* — Raul Rivas
(74) *Attorney, Agent, or Firm* — Brooks Kushman P.C.

(57) ABSTRACT

A method for network intercommunication is disclosed. The method includes a step of a Locator/ID Separation Protocol (LISP) communication end transmitting a data packet to an internet communication end. Another method for implementing network intercommunication and a corresponding system are also disclosed. The methods and system realize data intercommunication between the existing internet and the LISP network, and extends the applicable scope of the service.

18 Claims, 5 Drawing Sheets

(56) References Cited

OTHER PUBLICATIONS

International Search Report for PCT/CN2010/076206, English translation attached to original, Both completed by the Chinese Patent Office on Nov. 8, 2010, All together 8 Pages.

Japanese Office Action for JP 2012-529103, Dated Jul. 30, 2013, 3 Pages.

Lewis et al. Network Working Group Internet-Draft, Cisco Systems Inc. Dated May 26, 2009, 13 Pages. "Interworking LISP with IPv4 and IPv6 draft-ietf-lisp-interworking-00."

* cited by examiner

METHOD AND SYSTEM FOR IMPLEMENTING NETWORK INTERCOMMUNICATION

CROSS-REFERENCE TO RELATED APPLICATION

This application is the U.S. national phase of PCT Appln. No. PCT/CN2010/076206 filed Aug. 20, 2010 which claims priority to Chinese Application No. 200910171974.5 filed Sep. 17, 2009, the disclosures of which are incorporated in their entirety by reference herein.

TECHNICAL FIELD

The present invention relates to the field of communication, and in particular, to a method and system for implementing intercommunication between a Locator/ID Separation Protocol (LISP) network and an internet.

BACKGROUND ART

With the development of information technology, information network, with the Internet being the representative, has played more and more important function in the economic and social development. However, the Internet also exhibits more and more problems in the process of use. Only fixed reliable terminals were taken into consideration when the Internet was initially designed, so the Internet did not support terminal mobility, and there is also no internal security guarantee mechanism. With the development of radio technologies such as 3G, post-3G and 4G, the support of the Internet for mobile terminals has become a more and more urgent subject. Meanwhile, with the extension of the application scope of the Internet, the security problems also become more obvious, and these problems cannot be solved under the existing Internet technology framework.

Transmission Control Protocol/Internet Protocol (TCP/IP) is the basis of Internet. An IP address has dual attributes of identity and location, which is the root cause of inability of supporting mobility of the Internet. As the identity attribute of a terminal, an IP address cannot change during the period when the terminal moves, otherwise, the upper-layer service link such as TCP and User Datagram Protocol (UDP) will be interrupted due to the change of the address; as the location attribute of the terminal, the IP address must change during the period when the terminal moves (the address must have the prefix of the sub-network where the terminal is currently located), otherwise, the router cannot correctly forward the data packet to the terminal. Meanwhile, the dual attributes of the IP address are also the key reason that the security problem of the Internet cannot be solved thoroughly. Since an IP address must comprise the location identity of a terminal, the fixed IP address cannot be distributed to a mobile terminal, and the identity of an attacker such as a hacker cannot be determined according to the IP address in the Internet. This is the basic reason that the security problems in the current Internet such as attack, cheating, and abuse cannot be solved.

Regarding the defect of dual attributes of the IP protocol, many next-generation network technologies based on identity/location separation are being studied in the industry, and the technologies are generally divided into two types of solutions, namely network-based solutions and host-based solutions. LISP is a network-based solution, and can reduce the scale of the routing table of the Internet and can indirectly solve the mobility problem of the host. In the LISP solution, the location IP of an border routing device and the IP address for identifying the host are separated in two different spaces, and one border routing device can access any host LP address, and these host IP address fields are not exposed to the backbone network, and the routing table of the backbone network only stores the outer IP address of the tunnel router, i.e., for the backbone network, the tunnel router is analogous to the host of the network, the communication message between real hosts needs to be transmitted in the tunnel when being transmitted between backbone networks, and the header of a tunnel message is the address of the tunnel router. The location IP here is also called as Router Locator (RLoc), and the IP address of the host is also called as Endpoint Identity (EID).

Figure 1:
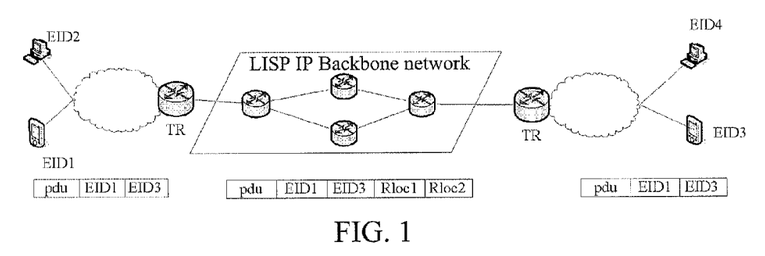
FIG. 1 illustrates the architecture of a LISP network.

The framework of the LISP network is as shown in FIG. 1. Both the source address and destination address of a host on the border of a tunnel router (TR) when initiating communication, are the Endpoint Identity (EID) of the terminal host, and the initiating TR, upon receiving a message, queries out the router locator (RLoc) of a TR router corresponding to the destination EID, and encapsulates the original message into the tunnel message, and the source address and destination address of the header of the tunnel message are the RLoc of the source TR and that of the destination TR.

The establishment, promotion and popularity of a network based on identity/location separation need a long time of period, so the identity/location separation network and the traditional Internet will coexist in the relatively long time. Therefore, these two networks need to intercommunicate with each other.

SUMMARY OF THE INVENTION

The technical problem to be solved in the present invention is to provide a method and system for implementing network intercommunication to realize intercommunication between a LISP network and an Internet.

In order to solve the above technical problem, the present invention provides a method for network intercommunication, comprising a step of a Locator/ID Separation Protocol (LISP) communication end sending a data packet to an Internet communication end, the step of a Locator/ID Separation Protocol (LISP) communication end sending a data packet to an Internet communication end comprising:

the LISP communication end sending a LISP single-layer data packet to a tunnel router (TR) of a LISP network, wherein a source address in the LISP single-layer data packet is an endpoint identity of the LISP communication end, and a destination address is an endpoint identity of the Internet communication end for intercommunicating with the LISP network;

the TR receiving the LISP single-layer data packet, analyzing and encapsulating the single-layer data packet into a LISP double-layer data packet and sending to an interworking service node (ISN), wherein in the LISP double-layer data packet, an outer source address is a router locator of the LISP communication end, an outer destination address is a router locator of the Internet communication end for intercommunicating with the LISP network, an inner source address is an endpoint identity of the LISP communication end, and an inner destination address is an endpoint identity of the Internet communication end for intercommunicating with the LISP network;

after receiving the LISP double-layer data packet, the ISN analyzing the LISP double-layer data packet and encapsulating into an IP data packet, wherein in the IP data packet, a source address is an IP address of the LISP communication end for intercommunicating with an Internet, and a destination address is an IP address of the Internet communication end; and the ISN sending the IP data packet to the Internet communication end through routing;

thereby realizing intercommunication between the LISP network and the Internet.

The method further comprises a step of the Internet communication end sending a data packet to the LISP communication end, and the step of the Internet communication end sending a data packet to the LISP communication end comprises:

the ISN receiving an IP data packet sent by the Internet communication end, wherein a source address in the IP data packet sent by the Internet communication end is the IP address of the Internet communication end, and a destination address is the IP address of the LISP communication end for intercommunicating with the Internet;

the ISN analyzing the IP data packet sent by the Internet communication end, encapsulating the IP data packet into a LISP dual-layer data packet and then sending to the TR, wherein, in the LISP dual-layer data packet encapsulated by the ISN, an outer source address is a router locator of the Internet communication end for intercommunicating with the LISP network, an outer destination address is a router locator of the LISP communication end, an inner source address is an endpoint identity of the Internet communication end for intercommunicating with the LISP network, and an inner destination address is an endpoint identity of the LISP communication end;

the TR de-encapsulating the LISP dual-layer data packet encapsulated by the ISN into a LISP single-layer data packet, wherein a source address in the LISP single-layer data packet de-encapsulated by the TR is the endpoint identity of the Internet communication end for intercommunicating with the LISP network, and a destination address is the endpoint identity of the LISP communication end; and the TR sending the LISP single-layer data packet de-encapsulated by the TR to the LISP communication end through routing.

The Internet communication end is a terminal or a service server of the Internet, and the LISP communication end is a service server or a terminal of the LISP network.

The endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN; the IP address of the LISP communication end for intercommunicating with the Internet is the endpoint identity of the LISP communication end, an exclusive fixed public network IP address or a shared public network IP address specially used for intercommunication.

In order to solve the above technical problem, the present invention further provides a method for implementing network intercommunication, wherein, a communication end of a Locator/ID Separation Protocol (LISP) network intercommunicates with a communication end of an Internet through a LISP data packet conversion device and an intercommunication data packet conversion device, a LISP communication end, located in a LISP network, has an endpoint identity for indicating identity, a router locator for indicating location, and an IP address for realizing intercommunication; the Internet communication end, located in an Internet, has an IP address, an endpoint identity for indicating identity and realizing intercommunication, and a router locator for indicating location, and the method comprises:

a step of transmitting a LISP single-layer data packet, wherein, the LISP single-layer data packet is transmitted between the LISP communication end and the LISP data packet conversion device, and a source address and a destination address of the LISP single-layer data packet are represented by endpoint identities;

a step of converting a LISP data packet, wherein, the LISP data packet conversion device implements inter-conversion between a LISP single-layer data packet and a LISP dual-layer data packet, outer source address and destination address of the LISP dual-layer data packet are represented by router locators, and inner source address and destination address are represented by endpoint identities;

a step of transmitting a LISP dual-layer data packet, wherein, the LISP dual-layer data packet is transmitted between the LISP data packet conversion device and an intercommunication data packet conversion device;

a step of converting an intercommunication data packet, wherein, the intercommunication data packet conversion device implements inter-conversion between a LISP dual-layer data packet and an IP data packet, and a source address and a destination address of the IP data packet are represented by IP addresses; and a step of transmitting an IP data packet, wherein the IP data packet is transmitted between the intercommunication data packet conversion device and the Internet communication end;

thereby realizing intercommunication between a location/identity separation network and the Internet.

The Internet communication end is a terminal or a service server of the Internet, and the LISP communication end is a service server or a terminal of the LISP network.

The endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN; the IP address of the LISP communication end for intercommunicating with the Internet is the endpoint identity of the LISP communication end, an exclusive fixed public network IP address or a shared public network IP address specially used for intercommunication.

In order to solve the above technical problem, the present invention provides a system for implementing network intercommunication, comprising an Internet communication end, an interworking service node (ISN), a tunnel router (TR) and a LISP communication end, wherein, the LISP communication end, located in a LISP network, is configured to send a LISP single-layer data packet to the TR, wherein, a source address in the LISP single-layer data packet is an endpoint identity of the LISP communication end, and a destination address is an endpoint identity of the Internet communication end for intercommunicating with the LISP network;

the TR, located in the LISP network and connected with the LISP communication end, is configured to receive the LISP single-layer data packet sent by the LISP communication end, and analyze and encapsulate the LISP single-layer data packet into a LISP double-layer data packet, and forward the LISP double-layer data packet to the ISN, wherein, in the LISP double-layer data packet, an outer source address is a router locator of the LISP communication end, an outer destination address is a router locator of the Internet communication end for intercommunicating with the LISP network, an inner source address is an endpoint identity of the LISP communication end, and an inner destination address is an endpoint identity of the Internet communication end for intercommunicating with the LISP network;

the ISN, connected with the TR, is configured to receive the LISP dual-layer data packet, and analyze and encapsulate the LISP dual-layer data packet into an IP data packet, wherein in the IP data packet, a source address is an IP address of the LISP communication end for intercommunicating with the Internet, and a destination address is an IP address of the Internet communication end; send the IP data packet to the Internet communication end through the Internet;

the Internet communication end, connected with the ISN through the Internet, is configured to receive and process the IP data packet sent by the ISN;

thereby realizing intercommunication between an identity/location separation network and an Internet.

The Internet communication end is further configured to transmit an IP data packet to the ISN, wherein in the transmitted IP data packet, a source address is the IP address of Internet communication end, and a destination address is an IP address of the LISP communication end for intercommunicating with the Internet;

the ISN is further configured to receive the EP data packet, analyze and encapsulate the IP data packet into an LISP dual-layer data packet, and forward the LISP dual-layer data packet to the TR, wherein in the LISP dual-layer data packet, an outer source address is a router locator of the Internet communication end for intercommunicating with the LISP network, an outer destination address is a router locator of the LISP communication end, an inner source address is an endpoint identity of the Internet communication end for intercommunicating with the LISP network, and an inner destination address is an endpoint identity of the LISP communication end;

the TR is further configured to receive the LISP dual-layer data packet, analyze and encapsulate the LISP dual-layer data packet into a LISP single-layer data packet, and send the LISP single-layer data packet to the corresponding LISP communication end, wherein in the LISP single-layer data packet, a source address is an endpoint identity of the Internet communication end, and a destination address is an endpoint identity of the LISP communication end in the LISP network;

the LISP communication end is further configured to receive and process the LISP single-layer data packet sent by the TR.

The Internet communication end is a terminal or a service server of the Internet, and the LISP communication end is a service server or a terminal of the LISP network.

The endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN; the IP address of the LISP communication end for intercommunicating with the Internet is the endpoint identity of the LISP communication end, an exclusive fixed public network IP address or a shared public network IP address specially used for intercommunication.

In order to solve the above technical problem, the present invention further provides another system for implementing network intercommunication, comprising:

a LISP communication end, which is located in a LISP network and has an endpoint identity for indicating identity, a router locator for indicating location, and an IP address for realizing intercommunication, and is configured to generate and process a LISP single-layer data packet, wherein a source address and a destination address of the LISP single-layer data packet are represented by endpoint identities; communicate with a LISP data packet conversion device through the LISP single-layer data packet;

the LISP data packet conversion device, which is configured to realize bidirectional conversion and forwarding of the LISP single-layer data packet and a LISP dual-layer data packet, wherein outer source address and destination address of the LISP dual-layer data packet are represented by router locators, and inner source address and destination address are represented by endpoint identities;

an intercommunication data packet conversion device, which is configured to realize bidirectional conversion and forwarding of the LISP dual-layer data packet and an IP data packet, wherein a source address and a destination address of the IP data packet are represented by IP addresses; communicate with an Internet communication end through the IP data packet; and the Internet communication end, which is located in an Internet and has an IP address, an endpoint identity for indicating identity and realizing intercommunication, and a router locator for indicating location, and is configured to generate and process the IP data packet;

thereby realizing intercommunication between a location/identity separation network and the Internet.

The Internet communication end is a terminal or a service server of the Internet, and the LISP communication end is a service server or a terminal of the LISP network.

The endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN; the IP address of the LISP communication end for intercommunicating with the Internet is the endpoint identity of the LISP communication end, an exclusive fixed public network IP address or a shared public network IP address specially used for intercommunication.

In the method and system for implementing intercommunication between a LISP network and the existing Internet (Legacy network) provided according to the present invention, the data intercommunication between a Legacy network and a LISP network is achieved by adding an intercommunication service node having the function of bidirectional conversion and forwarding of intercommunication data packets between the LISP network and the Legacy network, the applicable scope of the service is enlarged, and networks with different identities for distinguishing communication ends are enabled to intercommunicate with each other, which specifically comprises:

the terminal of the LISP network can access various services of the existing network, and intercommunicate with the terminal in the existing network;

the services of the LISP network, if implanted from the existing network, can be accessed by terminals in both the existing network and the LISP network;

the terminals in the existing network can access the LISP network without any modification, and can use the services in the existing network and the services implanted to the LISP network.

PREFERRED EMBODIMENTS OF THE INVENTION

The intercommunicating between an identity/location separation network and a traditional Internet means that a terminal in the identity/location separation network can intercommunicate with a terminal in the traditional Internet. The terminal in the identity/location separation network can access the services provided by the traditional Internet, and the terminal in the traditional Internet can also access the services provided by the identity/location separation network. However, currently there is still no perfect intercommunication scheme for solving this problem.

The network based on location/identity separation architecture (referred to as a LISP network hereinafter) mainly differs from the existing Internet (referred to as a Legacy network hereinafter) in the format and address of the data packet. The main idea of the method for implementing intercommunication between a location/identity separation (LISP in short) network and an existing Internet according to the present invention is that an interworking service node is added between the LISP network and the Internet, and the interworking service node implements the function of intercommunication data packet conversion, including mapping processing of the addresses, conversion of the format of the data packet and forwarding of the data packet, so as to achieve communication between the terminal or service server in the LISP network and the terminal or service server in the Legacy network.

Figure 2:
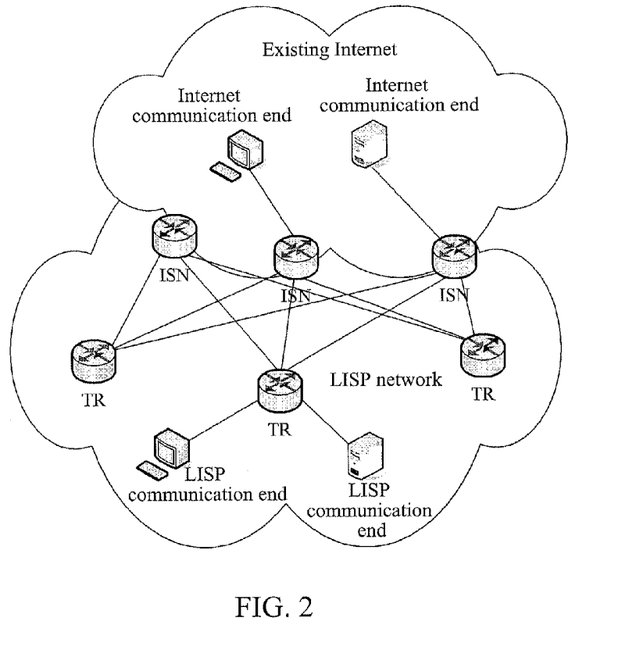
FIG. 2 is a first illustration of the intercommunication architecture of a LISP architecture network and a Legacy network according to the present invention.

The intercommunication architecture between the LISP network and the Legacy network is as shown in FIG. 2, comprising:

a LISP communication end, which is located in a LISP network and has an endpoint identity for indicating identity, a router locator for indicating location, and an IP address for realizing intercommunication, and is responsible for generating and processing a LISP single-layer data packet, and communicating with the tunnel router (TR) through the LISP single-layer data packet; wherein the source address and destination address of the LISP single-layer data packet are represented by endpoint identities; the specific functions of the LISP end comprise:

sending a LISP single-layer data packet to the TR, wherein the source address in the LISP single-layer data packet is the endpoint identity of the LISP communication end, and the destination address is the endpoint identity of the Internet communication end for intercommunicating with the LISP network; and further receiving and processing the LISP single-layer data packet sent by the TR, wherein, the source address is the endpoint identity of the Internet communication end, and the destination address is an endpoint identity of the LISP communication end in the LISP network;

a TR, which is located in the LISP network and connected with the LISP communication end, has the function of LISP data packet conversion, and is responsible for achieving bidirectional conversion and forwarding of the LISP single-layer data packet and the LISP double-layer data packet, wherein, the outer source address and destination address of the LISP dual-layer data packet are represented by router locators, and inner source address and destination address are represented by endpoint identities; the specific functions comprise:

receiving the LISP single-layer data packet sent by the LISP communication end, and analyzing and encapsulating the LISP single-layer data packet into a LISP double-layer data packet, and forwarding the LISP double-layer data packet to the ISN, wherein, in the LISP double-layer data packet, an outer source address is a router locator of the LISP communication end, an outer destination address is a router locator of the Internet communication end for intercommunicating with the LISP network, an inner source address is an endpoint identity of the LISP communication end, and an inner destination address is an endpoint identity of the Internet communication end for intercommunicating with the LISP network; and also receiving the LISP double-layer data packet, analyzing and encapsulating the LISP double-layer data packet into a LISP single-layer data packet and sending to the LISP communication end;

an Interworking Service Node (referred to as ISN hereinafter), which is connected with the TR, has the function of intercommunication data packet conversion, and is responsible for realizing bidirectional conversion and forwarding of the LISP dual-layer data packet and an IP data packet, wherein a source address and a destination address of the IP data packet are represented by IP addresses; its specific functions comprise:

receiving the LISP dual-layer data packet, analyzing and encapsulating the LISP dual-layer data packet into an IP data packet, and sending the IP data packet to the Internet communication end, wherein in the IP data packet, a source address is an IP address of the LISP communication end for intercommunicating with the Internet, and a destination address is an IP address of the Internet communication end; also receiving the IP data packet, analyzing and encapsulating the IP data packet into an LISP dual-layer data packet, and forwarding the LISP dual-layer data packet to the TR, wherein in the LISP dual-layer data packet, an outer source address is a router locator of the Internet communication end for intercommunicating with the LISP network, an outer destination address is a router locator of the LISP communication end, an inner source address is an endpoint identity of the Internet communication end for intercommunicating with the LISP network, and an inner destination address is an endpoint identity of the LISP communication end;

the Internet communication end, which is located in the existing Internet, and has an IP address, an endpoint identity for indicating identity and realizing intercommunication, and a router locator for indicating location, and is used to generate and process the IP data packet, and communicate with the ISN using the IP data packet; its specific functions comprise:

being connected with the ISN through the Internet, and being used to receive and process the IP data packet sent by the ISN; also being used to send the IP data packet to the ISN, wherein a source address in the IP data packet is the IP address of the Internet communication end, and a destination address is the IP address of the LISP communication end for intercommunicating with the Internet;

the aforementioned LISP communication end is a terminal or service server of the LISP network, and the Internet communication end is a terminal or a service server of the Internet. The above intercommunication architecture can achieve communication between a terminal in the LISP network and a terminal in the Internet, a terminal in the LISP network and a service server in the Internet, a terminal in the Internet and a terminal in the LISP network, and a terminal in the Internet and a service server in the LISP network.

The code of the endpoint identity (EID) of the service server or terminal of the Legacy network is determined by the LISP network according to the requirements on the compatibility of the terminal and the development stage of the LISP network, and the code may be a public network IPv4 address of the service server or terminal in the Legacy network, a public network IPv6 address of the service server or terminal in the Legacy network, or a long-bit (over 32 bits) number containing the public network IPv4 address of the service server or terminal in the Legacy network.

The router locator (RLoc) of the service server or terminal in the Legacy network is determined according to the development stage of the LISP network, and it may be a public network IPv4 address of the service server or terminal in the Legacy network, a public network IPv6 address of the service server or terminal in the Legacy network, a long-bit (over 32 bits) number containing the public network IPv4 address of the service server or terminal in the Legacy network, or an forwarded address of the ISN. A simple way to do this is that the EID, RLoc and IP address of the service server or terminal in the Legacy network are the same, and by adopting this identity rule, there is no need to distribute other identities or store the mapping relationship.

The IP address of the LISP service server or terminal may be an endpoint identity of the LISP communication end, an exclusive fixed public network IP address or a shared public network IP address specially used for intercommunication.

Figure 3:
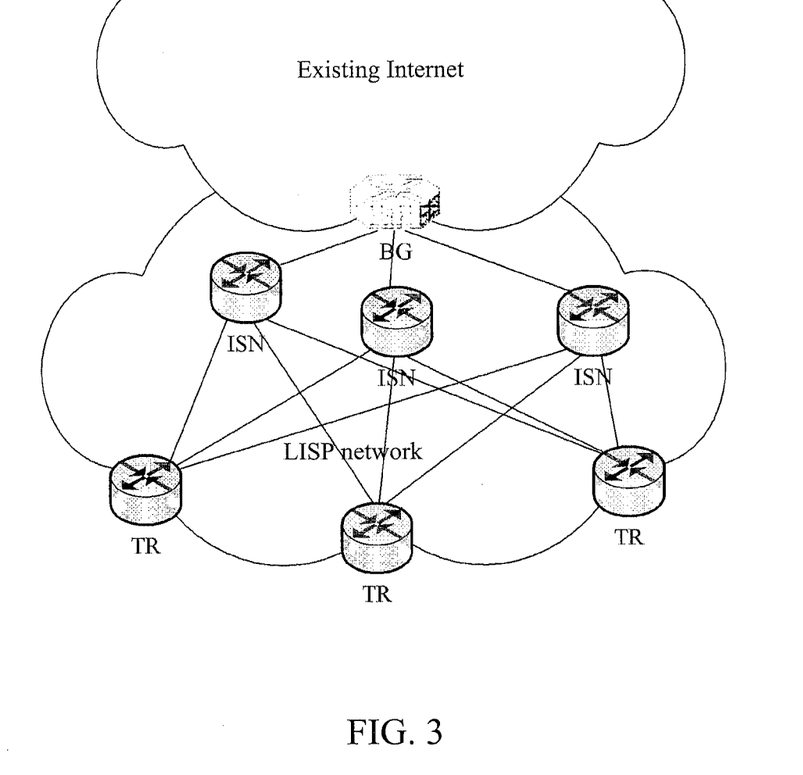
FIG. 3 is a second illustration of the intercommunication architecture of a LISP architecture network and a Legacy network according to the present invention.

In order to achieve the conversion of the above intercommunication data packets, the ISN needs to query the mapping relationship between EID, RLoc and IP address that is stored locally or in the mapping server so as to implement address conversion processing in data packet conversion, and it also needs to forward the converted data packet. In order to reduce the burden of the ISN, in specific implementations, a border gateway (BG) connected with the ISN may be disposed on the border between the LISP network and the Legacy network, and the BG is used to implement routing and forwarding of the IP data packet. The number and location of ISNs are configured according to the flux of intercommunication and the load share required by distribution, as shown in FIG. 3.

The method for intercommunication in the present invention will be further described in detail below by taking the network architecture shown in FIG. 3 as an example:

Application Example One

Figure 4:
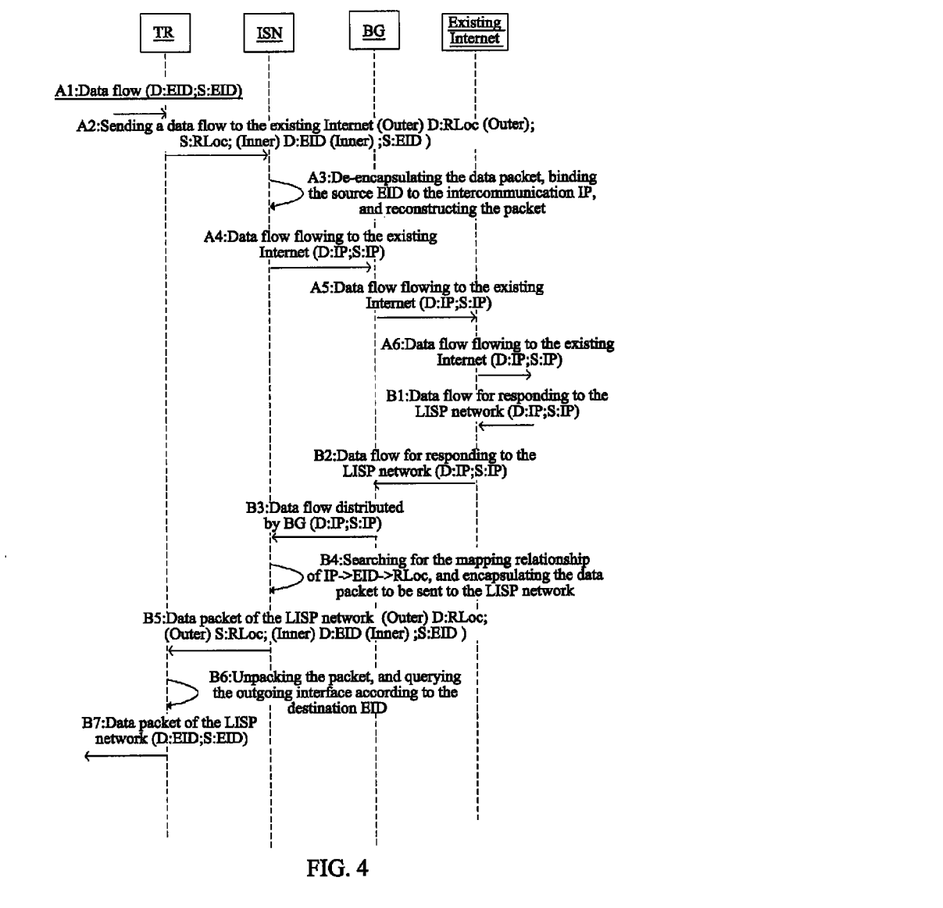
FIG. 4 is a data flowchart in an example of a terminal of the LISP architecture network accessing the service application in the Legacy network.

As shown in FIG. 4, the process of data packet processing for an uplink data flow (flowing from the LISP network to the Legacy network) when a terminal of a LISP network accesses a service server in the Legacy network comprises the following steps.

Step A1, the terminal of the LISP network sends to a TR a data packet for accessing the Legacy network, wherein the destination address of the data packet is the EID of a service server in the Legacy network and its source address is the EID of the terminal in the LISP network.

Step A2, the TR receives the data packet for the terminal of the LISP network to access the Legacy network, and queries the mapping plane to obtain the RLoc corresponding to the EID, converts the data packet into an encapsulated data packet in which the outer source address is the source RLoc, destination address is the Rloc address of the service server of the Legacy network; the inner source address is the EID of the terminal of the LISP network, and the destination address is the EID of the service server of the Legacy network.

Step A3, when the data packet in step A2 is forwarded to the ISN through routing, the outer encapsulation of the data packet is removed on ISN, the inner EID is analyzed, and an IP address for intercommunication between the terminal of the LISP network and the Legacy network is obtained for this EID according to the existing mapping relationship, and if there is no such IP address, an IP address for network intercommunication is newly distributed, and a mapping relationship is stored; on the ISN the data packet is reconstructed into a data packet in which the destination address is the public network address of the service server of the Legacy network, and the source address is the IP address of the terminal of the LISP network.

Steps A4-A6: the reconstructed uplink data packet in step A3 is forwarded to the corresponding service server according to routing in ISN, BG, and Legacy network.

Application Example Two

As shown in FIG. 4, the process of data packet processing for a downlink data flow (flowing from the Legacy network to the LISP network) when a terminal of a LISP network accesses a service server in the Legacy network comprises the following steps.

Steps B1-B3, the downlink data packet replied when the terminal of the LISP network accesses the Legacy network passes the Legacy network, BG and then reaches the ISN; the source address of the data packet is the public network address of the service server in the Legacy network, and its destination address is an IP address for intercommunication between the terminal of the LISP network and the Legacy network.

Step B4, the ISN obtains the EID and RLoc of the terminal of the LISP network through query according to the destination IP address of the data packet; on the ISN the data packet is reconstructed into a data packet in which the outer source address is the RLoc for intercommunication between the service server of the Legacy network and the LISP network, the destination address is the RLoc of the terminal of the LISP network; the inner source address is the EID for intercommunication between the service server of the Legacy network and the LISP network, and the inner destination address is the EID of the terminal of the LISP network.

Step B5, the reconstructed data packet in step B4 is forwarded to the TR through routing.

Step B6, the TR removes the outer encapsulation of the data packet, analyzes the inner EID, thus forming a data packet in which the destination address is the EID of the terminal of the LISP network, and the source address is the EID of the service server in the Legacy network, and searches for the outgoing interface of the data packet.

Step B7, according to the outgoing interface, the TR sends the data packet to the corresponding access terminal of the LISP network.

Application Example Three

Figure 5:
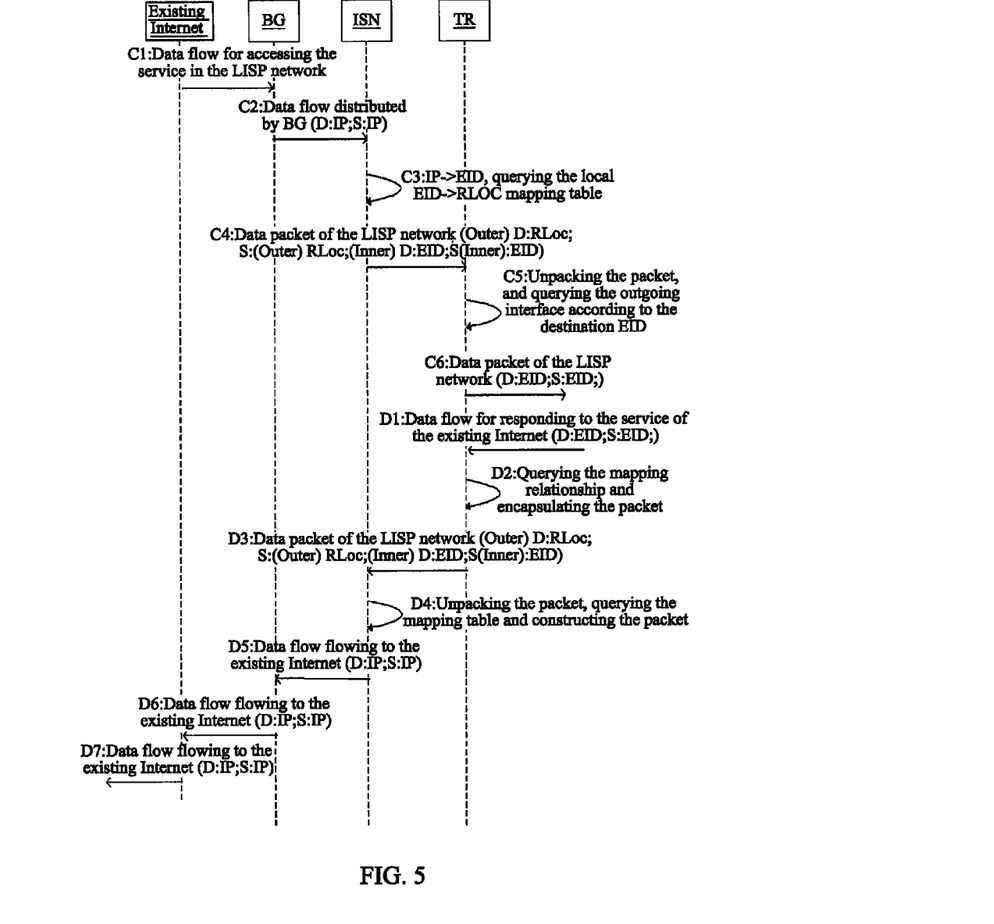
FIG. 5 is a data flowchart in an application of a terminal of the Legacy network accessing the service example in the LISP architecture network.

As shown in FIG. 5, the process of data packet processing for a downlink data flow (flowing from the Legacy network to the LISP network) when the Legacy network accesses a service server in a LISP network comprises the following steps.

Steps C1-C2, a downlink data packet for the Legacy network to access a service server of the LISP network passes the Legacy network, BG and then reaches the ISN; the source IP address of the data packet is the public network address of the terminal in the Legacy network, and its destination IP address is an IP address of the accessed service server in the LISP network for intercommunication with the Legacy network.

Steps C3-C5, the ISN queries the mapping relationship according to the IP address of the service server of the data packet, obtains the HD of the corresponding service server of the LISP network, and obtains the RLoc of the service server of the LISP network through query according to the EID.

Step C6, the data packet is converted on the ISN, according to the mapping relationship, into an encapsulated data packet in the LISP network whose outer source address is the RLoc of the terminal of the Legacy network for intercommunication with the LISP network, destination address is the RLoc of the service server in the LISP network; inner source address is the EID of the terminal of the Legacy network for intercommunication with the LISP network, and inner destination address is the EID of the service server of the LISP network.

Step C7, when the data packet in step C6 is forwarded to the TR through routing, the TR removes the outer encapsulation of the data packet, analyzes the inner EID, and reconstructs to form a data packet in which the destination address is the EID of the service server of the LISP network and the source address is the EID of the terminal in the Legacy network, and queries an outgoing interface to the service server of the LISP network.

Step C8, according to the outgoing interface, the TR forwards the data packet to the corresponding service server of the LISP network.

Application Example Four

As shown in FIG. 5, the process of data packet processing for an uplink data flow (flowing from the LISP network to the Legacy network) when a terminal of the Legacy network accesses a service server in a LISP network comprises the following steps.

Step D1, the uplink data packet returned when the terminal of the Legacy network accesses the service server of the LISP network is sent to the TR.

Step D2, the TR converts the uplink data packet into an encapsulated data packet of the LISP network, and sends it to the ISN; the outer source address of the data packet is the RLoc of the service server, its destination address is the RLoc of the terminal of the Legacy network for intercommunication with the LISP network; inner source address is the EID of the service server, and destination address is the EID of the terminal of the Legacy network for intercommunication with the LISP network.

Step D3, when the data packet in step D2 is forwarded to the ISN through routing, the ISN removes the outer encapsulation of the data packet, analyzes the inner EID, and obtains an IP address of the service server of the LISP network for intercommunication with the Legacy network according to the mapping, and the ISN converts the data packet into a data packet in which the destination address is the IP address of the terminal in the Legacy network, and the source address is the IP address of the service server in the LISP network.

Steps D4-D6, the reconstructed uplink data packet in step D3 is forwarded to the corresponding terminal of the Legacy network in ISN, BG and Legacy network.

The process of a terminal of the LISP network communicating with a terminal of the Legacy network is similar to the above flow, and thus will not be repeated here.

Figure 6:
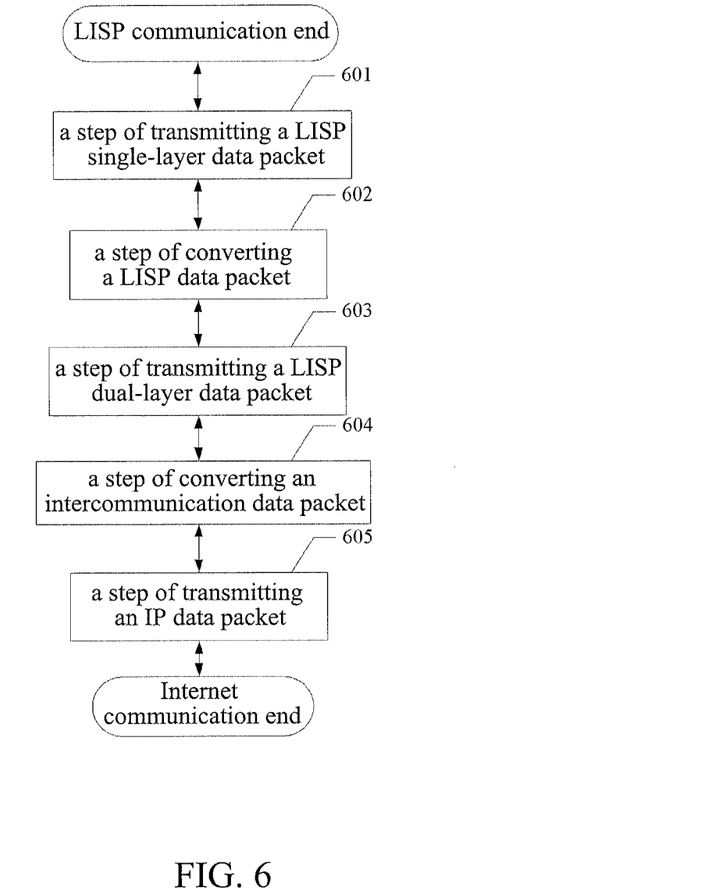
FIG. 6 illustrates achievement of intercommunication between the LISP architecture network and the Legacy network according to the present invention.

It can be seen from the above illustration and description that a LISP communication end communicates with an Internet communication end through a LISP data packet conversion device and an intercommunication data packet conversion device, wherein, the LISP communication end, located in a LISP network, has an endpoint identity for indicating identity, a router locator for indicating location, and an IP address for realizing intercommunication; the Internet communication end, located in an Internet, has an IP address, an endpoint identity for indicating identity and realizing intercommunication, and a router locator for indicating location; as shown in FIG. 6, the method for implementing intercommunication between an identity/location separation network and an Internet comprises:

step 601, a step of transmitting a LISP single-layer data packet, wherein, the LISP single-layer data packet is transmitted between the LISP communication end and the LISP data packet conversion device, and a source address and a destination address of the LISP single-layer data packet are represented by endpoint identities;

step 602, a step of converting a LISP data packet, wherein, the LISP data packet conversion device implements inter-conversion between the LISP single-layer data packet and a LISP dual-layer data packet, outer source address and destination address of the LISP dual-layer data packet are represented by router locators, and inner source address and destination address are represented by endpoint identities;

step 603, a step of transmitting a LISP dual-layer data packet, wherein, the LISP dual-layer data packet is transmitted between the LISP data packet conversion device and an intercommunication data packet conversion device;

step 604, a step of converting an intercommunication data packet, wherein, the intercommunication data packet conversion device implements inter-conversion between a LISP dual-layer data packet and an IP data packet, and a source address and a destination address of the IP data packet are represented by IP addresses;

step 605, a step of transmitting an IP data packet, wherein the IP data packet is transmitted between the intercommunication data packet conversion device and the Internet communication end.

It can be easily seen from the flows in FIG. 4 and FIG. 5 that the flow direction of the data packet determines the order of steps 601-605, and if the data packet is transmitted from an ID network communication end to an Internet communication end, then steps 601, 602, 603, 604, 605 are executed in sequence; if the data packet is transmitted from an Internet communication end to an ID network communication end, then steps 605, 604, 603, 602, 601 are executed in sequence.

The above content is only the examples of the present invention, and is not intended to limit the present invention. For a person having ordinary skill in the art, the present invention may have various modifications and changes. Any modification, equivalent substitution, improvement and the like made within the spirit and principle of the present invention shall fall within the scope of the claims of the present invention.

INDUSTRIAL APPLICABILITY

In the method and system for implementing intercommunication between a LISP network and the existing Internet (Legacy network) provided according to the present invention, the data intercommunication between a Legacy network and a LISP network is achieved by adding an interworking service node having the function of bidirectional conversion and forwarding of intercommunication data packets between the LISP network and the Legacy network, the applicable scope of the service is enlarged, and networks distinguishing communication ends using different identities are enabled to intercommunicate with each other, which specifically comprises:

the terminal of the LISP network can access various services of the existing network, and intercommunicate with the terminal in the existing network;

the services of the LISP network, if implanted from the existing network, can be accessed by terminals in both the existing network and the LISP network;

the terminals in the existing network can access the LISP network without any modification, and can use the services in the existing network and the services implanted to the LISP network.

What is claimed is:

1. A method for network intercommunication, comprising a step of a Locator/ID Separation Protocol (LISP) communication end sending a data packet to an Internet communication end, and the step of a Locator/ID Separation Protocol (LISP) communication end sending a data packet to an Internet communication end comprising:

the LISP communication end sending a LISP single-layer data packet to a tunnel router (TR) of a LISP network, wherein a source address in the LISP single-layer data packet is an endpoint identity of the LISP communication end, and a destination address is an endpoint identity of the Internet communication end for intercommunicating with the LISP network;

the TR receiving the LISP single-layer data packet, analyzing and encapsulating the single-layer data packet into a LISP double-layer data packet and sending to an interworking service node (ISN), wherein in the LISP double-layer data packet, an outer source address is a router locator of the LISP communication end, an outer destination address is a router locator of the Internet communication end for intercommunicating with the LISP network, an inner source address is the endpoint identity of the LISP communication end, and an inner destination address is the endpoint identity of the Internet communication end for intercommunicating with the LISP network;

after receiving the LISP double-layer data packet, the ISN analyzing and encapsulating the LISP double-layer data packet into an IP data packet, wherein in the IP data packet, a source address is an IP address of the LISP communication end for intercommunicating with an Internet, and a destination address is an IP address of the Internet communication end; and the ISN sending the IP data packet to the Internet communication end through routing;

thereby realizing intercommunication between the LISP network and the Internet;

the IP address of the LISP communication end for intercommunicating with the Internet is the endpoint identity of the LISP communication end, an exclusive fixed public network IP address or a shared public network IP address specially used for intercommunication.

2. The method according to claim 1, further comprising a step of the Internet communication end sending a data packet to the LISP communication end, and the step of the Internet communication end sending a data packet to the LISP communication end comprising:

the ISN receiving an IP data packet sent by the Internet communication end, wherein a source address in the IP data packet sent by the Internet communication end is the IP address of the Internet communication end, and a destination address is the IP address of the LISP communication end for intercommunicating with the Internet;

the ISN analyzing the IP data packet sent by the Internet communication end, encapsulating the IP data packet into a LISP dual-layer data packet and then sending to the TR, wherein, in the LISP dual-layer data packet encapsulated by the ISN, an outer source address is the router locator of the Internet communication end for intercommunicating with the LISP network, an outer destination address is the router locator of the LISP communication end, an inner source address is the endpoint identity of the Internet communication end for intercommunicating with the LISP network, and an inner destination address is the endpoint identity of the LISP communication end;

the TR de-encapsulating the LISP dual-layer data packet encapsulated by the ISN into a LISP single-layer data packet, wherein a source address in the LISP single-layer data packet de-encapsulated by the TR is the endpoint identity of the Internet communication end for intercommunicating with the LISP network, and a destination address is the endpoint identity of the LISP communication end; and the TR sending the LISP single-layer data packet de-encapsulated by the TR to the LISP communication end through routing.

3. The method according to claim 1, wherein, the Internet communication end is a terminal or a service server of the Internet, and the LISP communication end is a service server or a terminal of the LISP network.

4. The method according to claim 1, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

5. A method for implementing network intercommunication, wherein, a communication end of a Locator/ID Separation Protocol (LISP) network intercommunicates with a communication end of an Internet through a LISP data packet conversion device and an intercommunication data packet conversion device, a LISP communication end is located in a LISP network, and has an endpoint identity for indicating identity, a router locator for indicating location, and an IP address for realizing intercommunication; the Internet communication end is located in an Internet and has an IP address, an endpoint identity for indicating identity and realizing intercommunication, and a router locator for indicating location, and the method comprises:

a step of transmitting a LISP single-layer data packet, wherein, the LISP single-layer data packet is transmitted between the LISP communication end and the LISP data packet conversion device, and a source address and a destination address of the LISP single-layer data packet are represented by endpoint identities;

a step of converting a LISP data packet, wherein, the LISP data packet conversion device implements inter-conversion between a LISP single-layer data packet and a LISP dual-layer data packet, outer source address and destination address of the LISP dual-layer data packet are represented by router locators, and inner source address and destination address are represented by endpoint identities;

a step of transmitting the LISP dual-layer data packet, wherein, the LISP dual-layer data packet is transmitted between the LISP data packet conversion device and an intercommunication data packet conversion device;

a step of converting an intercommunication data packet, wherein, the intercommunication data packet conversion device implements inter-conversion between a LISP dual-layer data packet and an IP data packet, and a source address and a destination address of the IP data packet are represented by IP addresses; and a step of transmitting an IP data packet, wherein the IP data packet is transmitted between the intercommunication data packet conversion device and the Internet communication end;

thereby realizing intercommunication between a location/identity separation network and the Internet;

the IP address of the LISP communication end for intercommunicating with the Internet is the endpoint identity of the LISP communication end, an exclusive fixed public network IP address or a shared public network IP address specially used for intercommunication.

6. The method according to claim 5, wherein, the Internet communication end is a terminal or a service server of the Internet, and the LISP communication end is a service server or a terminal of the LISP network.

7. The method according to claim 5, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

8. A system for implementing network intercommunication, comprising an Internet communication end, an interworking service node (ISN), a tunnel router (TR) and a Locator/ID Separation Protocol (LISP) communication end, wherein, the LISP communication end, located in a LISP network, is configured to send a LISP single-layer data packet to the TR, wherein, a source address in the LISP single-layer data packet is an endpoint identity of the LISP communication end, and a destination address is an endpoint identity of the Internet communication end for intercommunicating with the LISP network;

the TR, located in the LISP network and connected with the LISP communication end, is configured to receive the LISP single-layer data packet sent by the LISP communication end, and analyze and encapsulate the LISP single-layer data packet into a LISP double-layer data packet, and forward the LISP double-layer data packet to the ISN, wherein, in the LISP double-layer data packet, an outer source address is a router locator of the LISP communication end, an outer destination address is a router locator of the Internet communication end for intercommunicating with the LISP network, an inner source address is an endpoint identity of the LISP communication end, and an inner destination address is an endpoint identity of the Internet communication end for intercommunicating with the LISP network;

the ISN, connected with the TR, is configured to receive the LISP dual-layer data packet, and analyze and encapsulate the LISP dual-layer data packet into an IP data packet, wherein in the IP data packet, a source address is an IP address of the LISP communication end for intercommunicating with the Internet, and a destination address is an IP address of the Internet communication end; send the IP data packet to the Internet communication end through the Internet;

the Internet communication end, connected with the ISN through the Internet, is configured to receive and process the IP data packet sent by the ISN;

thereby realizing intercommunication between an identity/location separation network and an Internet;

the IP address of the LISP communication end for intercommunicating with the Internet is the endpoint identity of the LISP communication end, an exclusive fixed public network IP address or a shared public network IP address specially used for intercommunication.

9. The system according to claim 8, wherein, the Internet communication end is further configured to transmit an IP data packet to the ISN, wherein in the transmitted IP data packet, a source address is the IP address of Internet communication end, and a destination address is an IP address of the LISP communication end for intercommunicating with the Internet;

the ISN is further configured to receive the IP data packet, analyze and encapsulate the LISP dual-layer data packet, and forward the LISP dual-layer data packet to the TR, wherein in the LISP dual-layer data packet, an outer source address is a router locator of the Internet communication end for intercommunicating with the LISP network, an outer destination address is a router locator of the LISP communication end, an inner source address is an endpoint identity of the Internet communication end for intercommunicating with the LISP network, and an inner destination address is an endpoint identity of the LISP communication end;

the TR is further configured to receive the LISP dual-layer data packet, analyze and encapsulate into a LISP single-layer data packet, and send the LISP single-layer data packet to the corresponding LISP communication end, wherein in the sent LISP single-layer data packet, a source address is an endpoint identity of the Internet communication end, and a destination address is an endpoint identity of the LISP communication end in the LISP network;

the LISP communication end is further configured to receive and process the LISP single-layer data packet sent by the TR.

10. The system according to claim 8, wherein, the Internet communication end is a terminal or a service server of the Internet, and the LISP communication end is a service server or a terminal of the LISP network.

11. The system according to claim 8, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

12. A system for implementing network intercommunication, comprising:

a Locator/ID Separation Protocol (LISP) communication end, which is located in a LISP network and has an endpoint identity for indicating identity, a router locator for indicating location, and an IP address for realizing intercommunication, and is configured to generate and process a LISP single-layer data packet, wherein a source address and a destination address of the LISP single-layer data packet are represented by endpoint identities; communicate with a LISP data packet conversion device through the LISP single-layer data packet;

the LISP data packet conversion device, which is configured to realize bidirectional conversion and forwarding of the LISP single-layer data packet and a LISP dual-layer data packet, wherein outer source address and destination address of the LISP dual-layer data packet are represented by router locators, and inner source address and destination address are represented by endpoint identities;

an intercommunication data packet conversion device, which is configured to realize bidirectional conversion and forwarding of the LISP dual-layer data packet and an IP data packet, wherein a source address and a destination address of the IP data packet are represented by IP addresses; communicate with an Internet communication end through the IP data packet; and the Internet communication end, which is located in an Internet and has an IP address, an endpoint identity for indicating identity and realizing intercommunication, and a router locator for indicating location, and is configured to generate and process the IP data packet;

thereby realizing intercommunication between the LISP network and the Internet;

the IP address of the LISP communication end for intercommunicating with the Internet is the endpoint identity of the LISP communication end, an exclusive fixed public network IP address or a shared public network IP address specially used for intercommunication.

13. The system according to claim 12, wherein, the Internet communication end is a terminal or a service server of the Internet, and the LISP communication end is a service server or a terminal of the LISP network.

14. The system according to claim 12, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

15. The method according to claim 2, wherein, the Internet communication end is a terminal or a service server of the Internet, and the LISP communication end is a service server or a terminal of the LISP network.

16. The method according to claim 2, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

17. The system according to claim 9, wherein, the Internet communication end is a terminal or a service server of the Internet, and the LISP communication end is a service server or a terminal of the LISP network.

18. The system according to claim 9, wherein, the endpoint identity of the Internet communication end is an IPv4 address, an IPv6 address or a long bit containing an IPv4 address of the Internet communication end in the Internet; the router locator of the Internet communication end is an IPv4 address, an IPv6 address, a long bit containing an IPv4 address of the LISP communication end in the Internet, or a router locator of the ISN.

* * * * *